Patented May 31, 1938

2,118,916

UNITED STATES PATENT OFFICE 2,118,916

TITANIUM-CONTAINING PIGMENTS

Julius Drucker, Leverkusen-I. G. Werk, Germany, assignor to I. G. Farbenindustrie Aktiengesellschaft, Frankfort-on-the-Main, Germany No Drawing. Application October 22, 1936, Serial No. 107,021. In Germany October 14, 1933

3 Claims. (Cl. 134—58)

This invention relates to improvements in titanium-containing pigments, more particularly it relates to a process of preparing such pigments by heating titanium-containing compounds, such as titanium hydrate under pressure in the presence of water and strong acids.

It is known that the process of calcination usually employed in the manufacture of titanium pigments, such as pure titanium dioxide or mixed pigments from titanium dioxide and barium sulfate, calcium sulfate, zinc oxide etc., can be replaced by the precipitation of the pigment at elevated temperature while applying superatmospheric pressure or also by treatment of the crude precipitate with liquid water under elevated pressure. But even if this heating treatment is effected in the neighborhood of the critical temperature of the water at about 370° C., the covering power and the tinting strength of the pigments obtained are in no way satisfactory.

I have now found that pigments displaying good covering power and tinting strength are obtained when the heating of the crude salt pigment obtained by hydrolysis of titanium salt solutions to a temperature of 250–370° C., under at least the pressure corresponding to the vapor pressure of the liquid at the temperature indicated is effected in the presence of a small amount of a free strong acid. I have also found that by the presence of a small amount of strong acid the temperature and the time required for obtaining a definite tinting strength are considerably diminished and that also other technically important qualities, for instance, the oil absorption, are improved to a marked extent.

Free strong acid can either be brought into the reacting solution from which the crude pigment is obtained from the beginning, or the reacting substances can be so selected that the small amount of strong acid is formed during the preparation of the crude pigment, or the strong acid can also be added to the suspension of the crude pigment in water which is to be subjected to the heating under pressure, or it can be added to the suspension during the heating under pressure, or it can be formed during the process.

The maintenance of a definite hydrogen ion concentration in the acid range in the reaction mixture influences the qualities of the pigment to a far reaching extent. If, for instance, pigments of the highest tinting strength and covering power are to be produced, a distinct acidity should be maintained in the reaction mixture which is preferably done by the addition of a strong acid.

The expression "strong acids" according to Falkenhagen, "Elektrolyte" Leipzig (1932), pages 4 and 5, is intended to include such acids which already in strong concentrations are dissociated to more than one half. Strong acids of the said kind are perchloric acid, hydrochloric acid, hydrobromic acid, hydriodic acid, nitric acid, sulfuric acid, hydrofluoric acid, fluosilicic acid and all organic sulfonic acids. The perchloric acid partly decomposes to hydrochloric acid under the conditions of pressure heating; the same holds true for the organic sulfonic acids which form sulfuric acid. That is to say these acids only act insofar as hydrochloric or sulfuric acid are formed on decomposition.

Very good results are obtained by applying from 1/100 gram equivalent of acid to 2 gram equivalents of acid calculated upon one liter of solution. The pigment obtained in accordance with this process immediately after the treatment described is soft and smooth and consists of particles of a size fit for use in paints and the like without the necessity of grinding. In many cases the addition of alkali metal halides, for instance, common salt and potassium bromide are of favorable influence on the pigments in particular their oil absorption.

The invention is further illustrated by the following examples without being restricted thereto:

*Example 1.*—190 parts by weight of titanium tetrachloride are introduced into 1000 parts by weight of an aqueous solution containing 160 parts by weight of sodium hydroxide and 130 parts by weight of sodium chloride while stirring and cooling in such a manner that the temperature of the solution during the precipitation does not essentially exceed 5° C. This suspension of finely divided titanic acid is acidified with 85 parts by weight of 20% hydrochloric acid and is then heated to about 360° C. under a pressure of 200 atmospheres and maintained at this temperature and this pressure for 30 minutes. Then the suspension is cooled and the titanium dioxide formed is converted into the finished pigment by filtering, washing and drying. The finished pigment is distinguished by a good covering power, lightness and whiteness and has a low oil absorption number.

*Example 2.*—800 parts by weight of the washed and filtered product as is obtained by hydrolysis of titanium sulfate solutions containing iron and containing about 500 parts by weight of titanium dioxide and about 35 parts by weight of $SO_3$ in the form of titanium sulfate, are suspended in a solution of 16 parts by weight of sodium hydroxide in 400 parts by weight of water and heated to about 360° C. under a pressure of 210 atmospheres for one hour. Thereupon the reaction mixture is cooled, the precipitate is separated from the solution, washed and dried. If in the drying process any caking has occurred, the caked lumps can be readily broken up by a simple crushing. This caking is different from the sintering of the pigment particles occurring in the calcining process, since after calcination the sintered pigment must be finely ground.

Example 3.—180 parts by weight of titanium tetrachloride are introduced into 1000 parts by weight of a solution containing 160 parts by weight of sodium hydroxide while stirring and cooling in such a manner that the temperature of the solution during the precipitation is maintained at 30 to 40° C. The sludge obtained is treated with so much of hydrochloric acid that the liquid contains still $\frac{1}{10}$ mol. of hydrochloric acid per liter after heating under pressure as described in Example 2. The pigment is treated as indicated in Example 2.

Example 4.—190 parts by weight of titanium tetrachloride are introduced at 0–50° C. into 1000 parts by weight of water while stirring and cooling. The clear solution obtained is evaporated whereby titanic acid is precipitated. The evaporation is continued until the sludge formed still contains 15 parts by weight of hydrochloric acid. Then the sludge is suspended in 500 parts by weight of water and heated under pressure and further treated as described in Example 2.

The pigments obtained in accordance with Examples 2, 3 and 4 are of excellent tinting strength and covering power, great softness and have a low oil absorption number.

Example 5.—190 parts by weight of titanium tetrachloride are introduced into a solution of 160 parts by weight of sodium hydroxide in 1000 parts by weight of water while stirring and cooling, so that the precipitation temperature does not essentially exceed 5° C. and that no vapors of hydrogen chloride or titanium tetrachloride escape. 100 parts by weight each of the said suspension of finely divided titanic acid or titanium dioxide are treated with 6.4 parts by weight of 50% nitric acid, 8.5 parts by weight of 20% hydrochloric acid, 20 parts by weight of 20% hydrobromic acid, 32 parts by weight of hydriodic acid, 5 parts by weight of 50% sulfuric acid, 5 parts by weight of 20% hydrofluoric acid, 37 parts by weight of 20% fluosilicic acid and 17 parts by weight of para-toluene sulfonic acid.

The single batches are further treated as indicated in Example 1. In this manner soft pigments of very good coloring power are obtained. Whiteness and lightness of the pigments are very good with the exception of the pigments treated with hydrofluoric acid and fluosilicic acid; they show a blue-grey tint, the pigment treated with para-toluene sulfonic acid has grey tint caused by the precipitating carbon.

This is a continuation in part of our co-pending application for Letters Patent Serial No. 6,599, filed Feb. 14, 1935.

I claim:—

1. The process of preparing titanium-containing pigments, which comprises hydrolyzing an aqueous solution containing a titanium salt at a temperature not exceeding the boiling point of the solution at atmospheric pressure and then heating the precipitated titanium-containing crude pigment in the presence of an aqueous solution containing a free strong acid to a temperature of between about 250 and about 370° C. under at least the pressure corresponding to the vapor pressure of the liquid at the temperature employed.

2. The process of preparing titanium-containing pigments, which comprises hydrolyzing an aqueous solution containing a titanium salt at a temperature not exceeding the boiling point of the solution at atmospheric pressure and then heating the precipitated titanium-containing crude pigment in the presence of an aqueous solution containing from 1/100 to 2 gram equivalents of a free strong acid per liter to a temperature of between about 250 and about 370° C. under at least the pressure corresponding to the vapor pressure of the liquid at the temperature employed.

3. The process of preparing titanium-containing pigments, which comprises hydrolyzing an aqueous solution containing a titanium salt at a temperature not exceeding the boiling point of the solution at atmospheric pressure and then heating the precipitated titanium-containing crude pigment in the presence of an aqueous solution containing from 1/100 to 2 gram equivalents of a free strong mineral acid per liter to a temperature of between about 250 and about 370° C. under at least the pressure corresponding to the vapor pressure of the liquid at the temperature employed.

JULIUS DRUCKER.